(12) United States Patent
Gay et al.

(10) Patent No.: US 10,642,771 B2
(45) Date of Patent: May 5, 2020

(54) DATA CHANNEL ALLOCATION

(71) Applicant: Hewlett-Packard Development Company, L.P., Houston, TX (US)

(72) Inventors: Raphael Gay, Fort Collins, CO (US); Peter Seiler, Wellington, CO (US); Shane Ward, Windsor, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/567,601

(22) PCT Filed: May 22, 2015

(86) PCT No.: PCT/US2015/032296
§ 371 (c)(1),
(2) Date: Oct. 18, 2017

(87) PCT Pub. No.: WO2016/190846
PCT Pub. Date: Dec. 1, 2016

(65) Prior Publication Data
US 2018/0095919 A1    Apr. 5, 2018

(51) Int. Cl.
*G06F 13/00*    (2006.01)
*G06F 13/38*    (2006.01)
(Continued)

(52) U.S. Cl.
CPC ........ *G06F 13/385* (2013.01); *G06F 13/4068* (2013.01); *G06F 13/4282* (2013.01); *G06F 2213/0042* (2013.01)

(58) Field of Classification Search
None
See application file for complete search history.

(56) References Cited

U.S. PATENT DOCUMENTS 5,758,171 A * 5/1998 Ramamurthy ............ G06F 1/26
                                                    713/300
5,818,845 A * 10/1998 Moura ............... H04B 7/18523
                                                    370/449
(Continued)

FOREIGN PATENT DOCUMENTS

CN    1465009 A    12/2003
CN    101470685 A    7/2009
(Continued)

OTHER PUBLICATIONS

10GbE Virtual Fabric Adapter (CFFh) for IBM BladeCenter, Datasheet, Oct. 25, 2010, pp. 1-2, Emulex.
(Continued)

*Primary Examiner* — Steven G Snyder
*Assistant Examiner* — Dean Phan
(74) *Attorney, Agent, or Firm* — Brooks Cameron & Huebsch PLLC

(57) ABSTRACT

Examples disclosed herein relate to data channel allocation. An example includes an apparatus, including a resource to connect to a controller in a first state and a peripheral card in a second state. Example apparatus include a controller to control a connection to an interface card and to connect to the resource via a first data channel in the first state, the first data channel to connect the resource and the peripheral card in the second state.

18 Claims, 3 Drawing Sheets

(51) Int. Cl.
  *G06F 13/40*  (2006.01)
  *G06F 13/42*  (2006.01)

(56) References Cited

U.S. PATENT DOCUMENTS

| | | |
|---|---|---|
| 6,256,700 B1 | 7/2001 | Sauber |
| 6,347,352 B1 | 2/2002 | Jeddeloh et al. |
| 7,782,325 B2 | 8/2010 | Gonzalez et al. |
| 8,069,293 B1 | 11/2011 | Rogan et al. |
| 8,484,399 B2 | 7/2013 | Berke et al. |
| 8,719,465 B2 | 5/2014 | Ganapathy et al. |
| 2007/0180179 A1 | 8/2007 | Irisa |
| 2007/0276981 A1* | 11/2007 | Atherton ............. G06F 13/4022 710/307 |
| 2008/0155157 A1 | 6/2008 | Lee |
| 2013/0138877 A1 | 5/2013 | Ganapathy et al. |
| 2013/0346653 A1 | 12/2013 | Freking et al. |

FOREIGN PATENT DOCUMENTS

| | | |
|---|---|---|
| CN | 103502963 A | 1/2014 |
| EP | 1571559 | 9/2005 |
| TW | 201445331 A | 12/2014 |

OTHER PUBLICATIONS

Intel 10 Gigabit AF DA Dual Port Server Adapter, Product Brief, Apr. 7, 2008, pp. 1-4, Intel Corporation.

* cited by examiner

DATA CHANNEL ALLOCATION

BACKGROUND

The number of devices that can be coupled to a computing device has been increasing. As the number of devices increases, more and more data channels and internal components are required to support communication between the device and the computing device.

BRIEF DESCRIPTION OF THE DRAWINGS

The following detailed description references the drawings, wherein.

DETAILED DESCRIPTION

Figure 1:
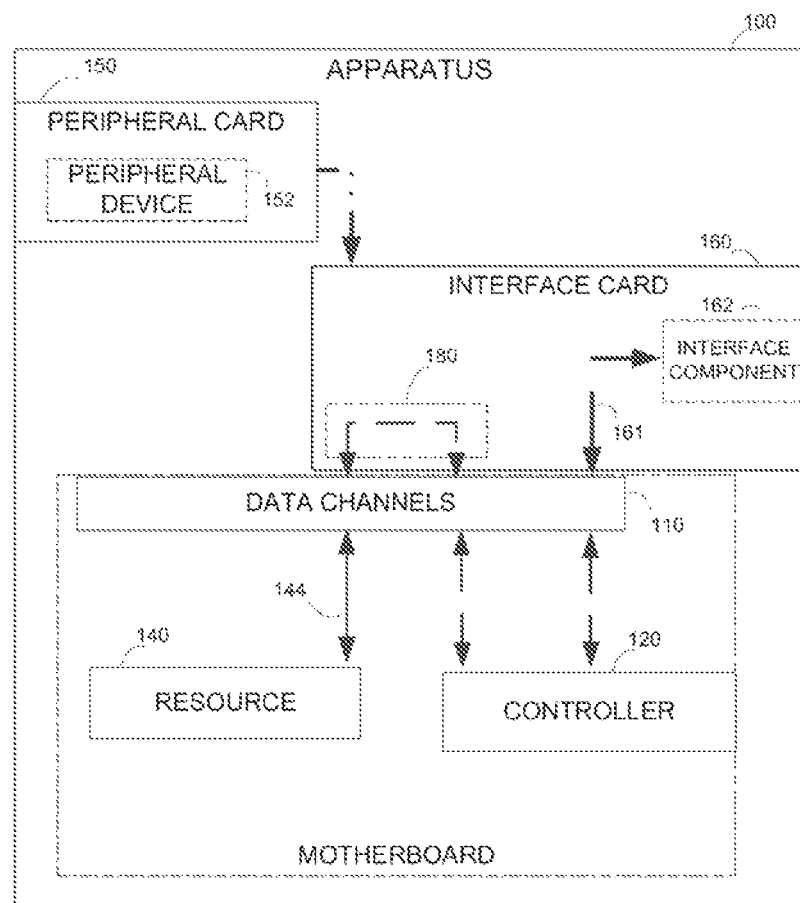
FIG. 1 is a block diagram of an example apparatus to allocate data channels.

In the following discussion and in the claims, the term "connect" or "connections" is intended to include suitable indirect and/or direct connections. Thus, if a first component is described as being connected to a second component, that connection may, for example, be: (1) through a direct electrical and/or mechanical connection, (2) through an indirect electrical and/or mechanical connection via other devices and connections, (3) through an optical electrical connection, (4) through a wireless electrical connection, and/or (5) another suitable coupling. A "computing device" or "device" may be a desktop computer, laptop (or notebook) computer, workstation, tablet computer, mobile phone, smartphone, smart watch, smart wearable glasses, smart device, server, blade enclosure, imaging device, or any other processing device or equipment with an transceiver, transverters, repeaters, etc. to access a peripheral device.

To connect a peripheral device to a computing device, a physical connection between the peripheral device and the computing device must be made. A peripheral device generally needs a connection to an internal resource (e.g., a chipset, a computer processing unit, a root port, etc.) to communicate with the computing device. Some peripheral devices connect to a computing device via an interface. In such examples, a controller is connected to the interface to control the peripheral device via the interface, The physical connection from the interface or peripheral device to the controller and/or internal resource is made through data channels. A computing device has a limited and fixed number of data channels. A number of rules govern how many data channels are allotted to a specific component and/or peripheral device in a computing device. As computing devices integrate more input/output functions more data channels are needed to provide sufficient bandwidth to supply the connected devices. Supplying data channels to devices often results in sacrificing (i.e., not using) other data channels connected to the resource. The same tradeoff must be made between dedicating data channels to interfaces which need controllers to operate with devices. When a peripheral device is not connected to the interface, the data channels allocated to the controller are not being used.

To address these issues, in the examples described herein, a data channel allocation apparatus and method is described. In examples, an apparatus may enable a connection between a component(s) on an interface card by allocating data channels and a controller on a motherboard of the apparatus when the component is detected connected to the apparatus. In the examples described herein, when the component is not detected, the controller of the component is not connected to a resource. In such examples, the data channel used to connect the controller to the resource may be used instead to connect a peripheral device on a peripheral card to the resource when the component is not detected. The interface card may direct the data channel from the resource to the controller. In such an example, the apparatus retains the ability to use data channels connected to the resource to support devices and interfaces without dedicating specific data channels to form a connection to a controller. In some examples, this may result in space and/or cost saving on a motherboard of the apparatus.

Referring now to the drawings, FIG. 1 is an example apparatus 100 to allocate data channels 110. Apparatus 100 includes data channels 110, a controller 120, a resource 140, a peripheral card 150, and an interface card 160.

In the example of FIG. 1, peripheral card 150 may be an add-in-card connected to data channels 110. In some examples, peripheral card 150 may include a peripheral device 152 connected to resource 140 via data channels 110, such as, a standard Peripheral Component interconnect Express (PCIe) device, a graphics device, storage device, network device, USB device, etc.

In the example of FIG. 1, interface card 160 may be an add-in-card connected to data channels 110. In examples, interface card 160 may include an interface bus 161, an interface component 162, and a loop-back connection 180. In examples, interface component 162 may be a component to provide an interface or port to a peripheral device. In some examples, interface card 160 may include a universal serial bus (USB) port, a local area network (LAN) port, network port, a data port, a display port, a Serial Attached Small Computer System Interface (SAS) port, a Serial ATA (SATA) port, a Thunderbolt port, an Infiniband port, a multi-media port, a media card port, an High-Definition Multimedia Interface (HDMI) port, a Non-Volatile Memory Express (NVMe) port, or a combination thereof. In an example, interface bus 161 may be connected to interface component 162 and controller 120 via data channels 110. In the example of FIG. 1, loop-back connection 180 may be any combination of hardware and/or machine readable instructions to form the connection between controller 120 and resource 140 via data channels 110. In some examples, interface card 160 may include additional components (not depicted) to provide apparatus 100 with additional features. For example, interface card 160 may include a bridge circuit that provides the loop-back connection 180 and to connect a second peripheral device to resource 140.

As used herein, a "data channel" refers to any type of connection between components in a computing device or peripheral devices and all communication protocols for the connection, such as, Accelerated Graphics Port (ACP), Peripheral Component Interconnect (PCI), Peripheral Component Interconnect eXtended (PCI-X), PCIe, etc. As used in FIG. 1, data channels 110 illustrates various data channel slots through which peripheral card 150 or interface card 160 is connected to apparatus 100, such as a PCI slots, PCIe slots, etc. In an example, other peripheral devices (not shown) may also be connected to data channels 110 via any available data channel.

Controller 120 may be any type of controller including hardware and/or machine readable instructions to control interface component 162 connected to apparatus 100 via interface card 160. Controller 120 may be connected to a motherboard of apparatus 100. In some examples, controller 120 may be an integrated or embedded controller to connect to interface card 160 and resource 140. For example, controller 120 may be a media access controller (MAC) controller, a memory controller, a bus controller, a USB controller, a LAN controller, a network controller, a data controller, a display controller, a SAS controller, a SATA controller, a Thunderbolt controller, an Infiniband controller, a multi-media controller, a media card reader controller, a HDMI controller, a NVMe controller, or a combination thereof. In the example of FIG. 1 controller 120 may be connected to interface component 162 via data channels 110. In some examples, controller 120 may also be connected to interface card 160 via additional components, such as, a physical layer interface (PHY), a switch, a bridge, redriver, etc. For example, controller 120 may be a MAC controller and may be connected to interface card 160 via a PHY bus 161. In some examples, controller 120 may be a separate component or may be part of another component in apparatus 100. For example, controller 120 may be a MAC controller in a chipset. In some examples, an additional component may be connected to controller 120 to electrically isolate controller 120 from other components in apparatus 100 when interface card 160 is not present in apparatus 100.

Figure 3:
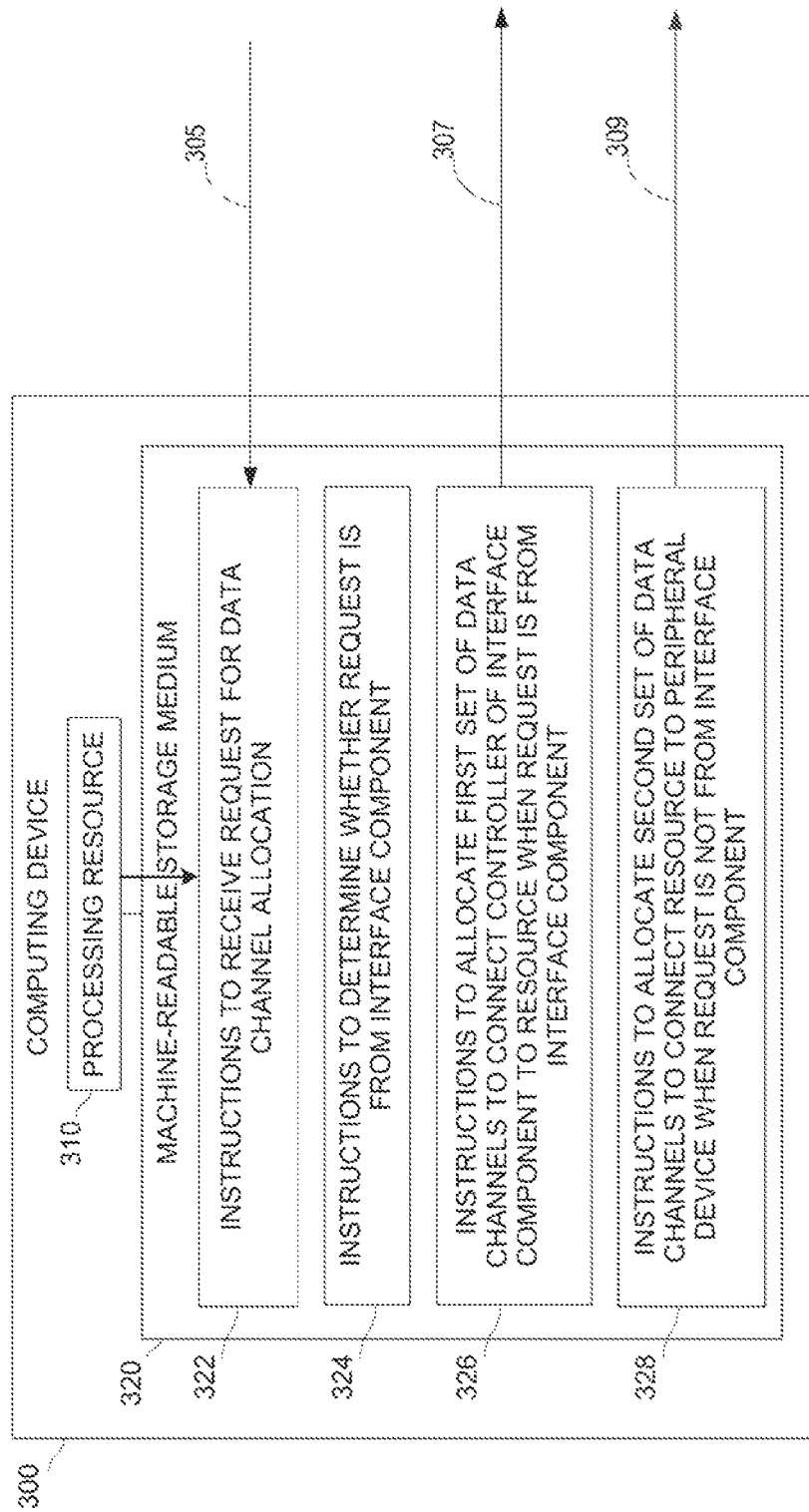
FIG. 3 s a block diagram of an example computing device to allocate data channels.

In some examples, resource 140 may be any processing resource, such as, a chipset, a central processing unit, etc., or a device which provides access to such processing resource, such as a root complex device (e.g., a PCIe root port, a PCI root port, etc.), etc. In examples described herein, a processing resource may include, for example, one processor or multiple processors included in a single computing device (as shown in FIG. 3) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof.

In the example of FIG. 1, resource 140 may provide a connection to controller 120 in a first state and to peripheral device 150 in a second state. In the first state, loop-back connection 180 may route a data channel connected to controller 120 to resource 140. For example, as shown in FIG. 1, one or more bus(es) 144 may extend from resource 140 to data channel 110 to be connected to controller 120 via interface card 160 and loop-back connection 180. In the second state, resource 140 is connected to peripheral card 150 via bus(es) 144. In some examples, the number of buses 144 routed to resource 140 in the first state may be less than the number of buses 144 routed to resource 140 in the second state. For example, in the first state, two (2) buses may be routed from resource 140 to controller 120 and in the second state four (4) buses may be routed from resource 140 to peripheral card 150. In the example of FIG. 1, in the second state, controller 120 is electrically isolated from resource 140 and resource 140 is connected to peripheral card 150. In some examples, controller 120 may determine when interface card 160 is connected to apparatus 100. In other examples, resource 140 may determine when interface card 160 is connected to apparatus 100. In yet another example, another component (not depicted) in apparatus 100 (e.g., a manager, controller enablement circuit, etc.) may determine when interface card 160 is connected to apparatus 100.

In the example of FIG. 1, when interface card 160 is connected to apparatus 100 the first state is established in which data channels are allocated to connect controller 120 to interface component 162 and resource 140. Similarly, in the example of FIG. 1, when interface card 160 is not connected to apparatus 100 the second state is established in which resource 140 is connected to peripheral card 150. In such examples, apparatus 100 may use data channels connected to resource 140 to support peripheral device 152 and interface card 160 without dedicating specific data channels to form a connection to controller 120 in all states. In some examples, this may result in space and/or cost saving on a motherboard of apparatus 100.

Figure 2:
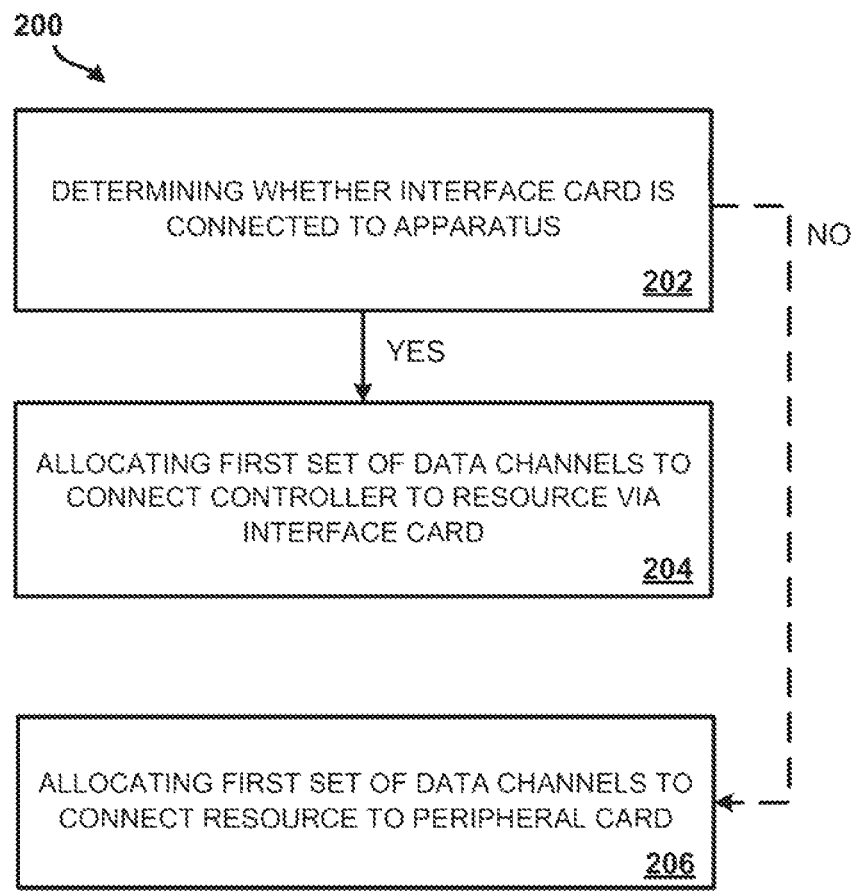
FIG. 2 is a flowchart of an example method for data channel allocation.

FIG. 2 is a flowchart of an example method 200 for data channel allocation. Although execution of method 200 is described below with reference to apparatus 100 described above, other suitable systems for the execution of method 200 can be utilized. Additionally, implementation of method 200 is not limited to such examples.

At 202 of method 200, apparatus 100 determines whether interface card 160 is connected apparatus 100.

At 204, apparatus 100 allocates a first set of data channels to connect controller 120 to resource 140 via interface card 160 when interface card 160 is connected to apparatus 100. In an example, loop-back connection 180 of interface card 160 is to route the first set of data channels from resource 140 to controller 120 via slots in data channels 110. In some examples, controller 120 is to connect to interface component 162 on interface card 160 via interface bus 101. In examples, resource 140 may be connected to a second peripheral device via a bridge circuit in interface card 160 to connect to the second peripheral device.

Optionally, at 206, apparatus 100 allocates the first set of data channels to connect resource 140 to peripheral device 152 of peripheral card 150 when interface card 160 is not connected to apparatus 100. In some examples, controller 120 is electrically isolated from other components in apparatus 100 when interface card 160 is not connected to apparatus 100.

Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1 and 3.

Referring now to the drawings, FIG. 3 is a block diagram of an example computing device 300 to allocate data channels. In the example of FIG. 3, computing device 300 includes a processing resource 310 and a machine readable storage medium 320 comprising (e.g., encoded with) instructions 322, 324, 326, and 328 executable by processing resource 310. In some examples, storage medium 320 may include additional instructions. In some examples, instructions 322, 324, 326, 328 and any other instructions described herein in relation to storage medium 320, may be stored on a machine-readable storage medium remote from but accessible to imputing device 300 and processing resource 310 (e.g., via a computer network). In some examples, instructions 322, 324, 326, and 328 may be instructions of a computer program, computer application (app), agent, or the like, of computing device 300. In other examples, the functionalities described herein in relation to instructions 322, 324, 326, and 328 may be implemented as engines comprising any combination of hardware and programming to implement the functionalities of the engines, as described below.

In examples described herein, processing resource 310 ay fetch, decode, and execute instructions stored on storage medium 320 to perform the functionalities described below. In other examples, the functionalities of any of the instructions of storage medium 320 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 3, instructions 322 may passively acquire (i.e., receive) or actively acquire (e.g., retrieve) with computing device 300 a request for data channel allocation 305.

Instruction 324 may determine whether request for data channel allocation 305 is from an interface component.

Instruction 326 may allocate a first set of data channels 307 to connect a controller of the interface component to a resource when request for data channel allocation 305 is from the interface component.

Instructions 328 may allocate a second set of data channels 309 to connect the resource to a peripheral device when the request for data channel allocation 305 is not from the interface component. In the example of FIG. 3, the first set of data channels 307 is a subset of the second set of data channels 309. In some examples, the controller of the interface component may be electrically isolated in the second state.

In some examples, instructions 322, 324, 326, and 328 may be part of an installation package that, when installed, may be executed by processing resource 310 to implement the functionalities described herein in relation to instructions 322, 324, 326, and 328. In such examples, storage medium 320 may be a portable medium, such as a CD, DVD, flash drive, or a memory maintained by a computing device from which the installation package can be downloaded and installed. In other examples, instructions 322, 324, 326, and 328 may be part of an application, applications, or component already installed on apparatus 300 including processing resource 310. In such examples, the storage medium 320 may include memory such as a hard drive, solid state drive, or the like. In some examples, functionalities described herein in relation to FIG. 3 may be provided in combination with functionalities described herein in relation to any of FIGS. 1-2.

What is claimed is:

1. An apparatus, comprising:
an embedded controller to control an interface component when an interface card is physically connected to the apparatus; and
a resource to:
connect to the embedded controller through a data channel, connected to the resource, routed through a loop-back connection in the interface card to the embedded controller when the resource is in a first state, wherein the first state includes the interface card physically coupled to the data channel; and
connect to a peripheral card through the data channel, connected to the resource, coupleable to the peripheral card when the resource is in a second state, wherein the second state includes the interface card physically decoupled from the data channel and the embedded controller to electrically isolate the embedded controller from the data channel and the peripheral card.

2. The apparatus of claim 1, wherein the embedded controller is connected to an interface component of the interface card via an interface bus.

3. The apparatus of claim 1, wherein the resource is a computer processing unit (CPU), a chipset, a root complex device, or a combination thereof.

4. The apparatus of claim 1, wherein the interface card includes a universal serial bus (USB) port, a local area network (LAN) port, network port, a data port, a display port, a Serial Attached Small Computer System Interface (SAS) port, a Serial ATA (SATA) port, a Thunderbolt port, an Infiniband port, a multi-media port, an media card port, an High-Definition Multimedia Interface (HDMI) port, and a Non-Volatile Memory Express (NVMe) port, or a combination thereof.

5. The apparatus of claim 1, wherein the embedded controller is a media access controller (MAC) controller, a memory controller, a bus controller, a universal serial bus (USB) controller, a local area network (LAN) controller, a network controller, a data controller, a display controller, a Serial Attached Small Computer System Interface (SAS) controller, a Serial ATA (SATA) controller, a Thunderbolt controller, an Infiniband controller, a multi-media controller, a media card reader controller, an High-Definition Multimedia Interface (HDMI) controller, a Non-Volatile Memory Express (NVMe) controller, or a combination thereof integrated in a same motherboard as the resource.

6. The apparatus of claim 1, wherein the resource and the embedded controller are integrated in a same motherboard.

7. The apparatus of claim 6, wherein the loop-back connection in the interface card comprises an electrical bridge to electrically connect a first data channel of the motherboard to a second data channel of the motherboard.

8. The apparatus of claim 7, wherein the first data channel of the motherboard and the second data channel of the motherboard are not electrically connected when the interface card is not physically connected to the motherboard.

9. A method for data channel allocation, comprising:
determining whether an interface card is physically connected to a motherboard;
in response to determining that the interface card is physically connected to the motherboard, allocating a set of data channels to connect an embedded controller to a resource via a loop-back connection in the interface card, wherein the loop-back connection is to electrically connect the embedded controller to the resource by routing the set of data channels through the loop-back connection and to the embedded controller, wherein the embedded controller is to control an interface component when the interface card is connected to the motherboard;
in response to determining that the interface card is not physically connected to the motherboard, reallocating the set of data channels connected to the resource to connect the resource to a peripheral card, wherein the set of data channels are to connect the resource to the peripheral card when the loop-back connection is physically decoupled electrically isolating the embedded controller from the resource and the peripheral card,
wherein the resource, the embedded controller, and the set of data channels are integrated on the motherboard and the loop-back connection and the interface component are in the interface card.

10. The method of claim 9, wherein the interface card is to route the set of data channels from the resource of the apparatus to the embedded controller of the apparatus via a bridge.

11. The method of claim 10, wherein the bridge is to connect the resource of the apparatus directly to a second peripheral device while the set of data channels from the resource of the apparatus are routed to the embedded controller of the apparatus via a bridge.

12. The method of claim 11, wherein the interface component is connected to the embedded controller of the apparatus via an interface bus when the interface card is connected to the apparatus.

13. The method of claim 9, wherein the loop-back connection comprises an electrical bridge to electrically connect a first data channel of the set of data channels in the motherboard to a second data channel in the motherboard, wherein the second data channel is connected to the embedded controller, and wherein the first data channel and the second data channel are not electrically connected when the interface card is not physically connected to the motherboard.

14. A non-transitory machine-readable storage medium comprising instructions executable by a processing resource to:
receive a request for data channel allocation;
determine whether the request is from an interface component;
in response to a determination that the request is from the interface component, allocate a first set of data channels to connect a controller for the interface component to a resource, wherein the interface component includes a loop-back connection to connect the controller to the resource by routing the first set of data channels connected to the resource through the loop-back connection and to the controller; and
in response to a determination that the request is not from the interface component, reallocate a second set of data channels to connect the resource to a peripheral device, wherein the first set of data channels is a subset of the second set of data channels and wherein the controller is electrically isolated from the resource and the peripheral device while the peripheral device remains coupled into the motherboard,
wherein the resource and the controller are integrated on the motherboard of a computing device and the loop-back connection and the interface component are integrated on the interface card.

15. The non-transitory machine readable storage medium of claim 14, wherein a data channel of the first set of data channels is connected to an interface card when the request is from the interface component.

16. The non-transitory machine readable storage medium of claim 15, wherein the interface card is to route the first set of data channels to connect the controller to the resource.

17. The non-transitory machine readable storage medium of claim 14, wherein the interface component is to connect to the controller via an interface bus on the interface card when the request is from the interface component.

18. The non-transitory machine readable storage medium of claim 14, wherein the loop-back connection comprises an electrical bridge between the first set of data channels on the motherboard and a third set of data channels, on the motherboard, connected to the controller and wherein the first set of data channels and the third set of data channels are not electrically coupled when the interface component is not physically connected to the motherboard.

* * * * *